Dec. 29, 1964 W. W. WITORT 3,163,710
CONNECTION MEANS FOR DIVIDED ELECTRICAL RACEWAYS
Filed Jan. 17, 1962 2 Sheets-Sheet 1
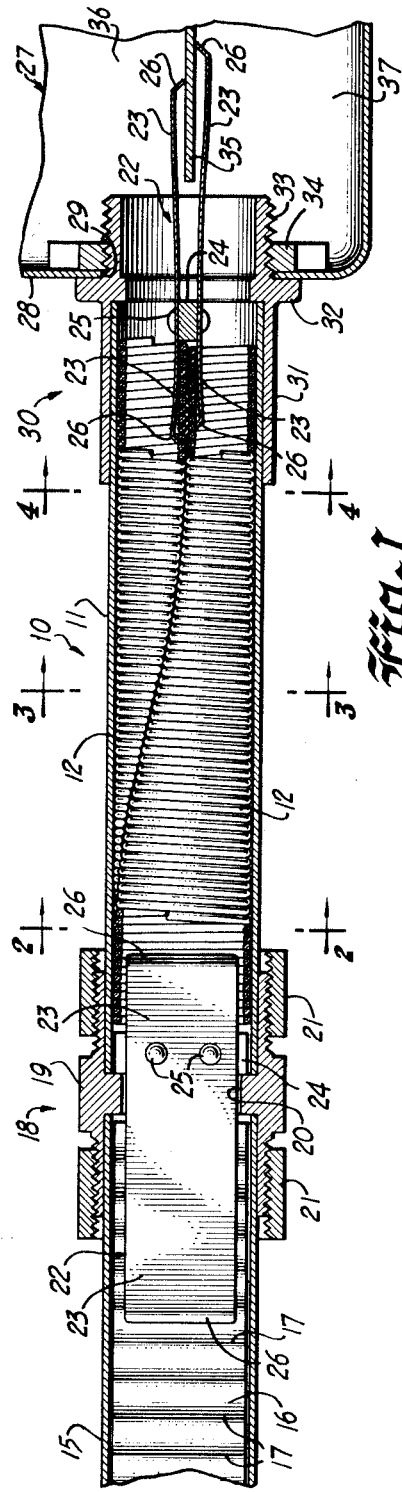
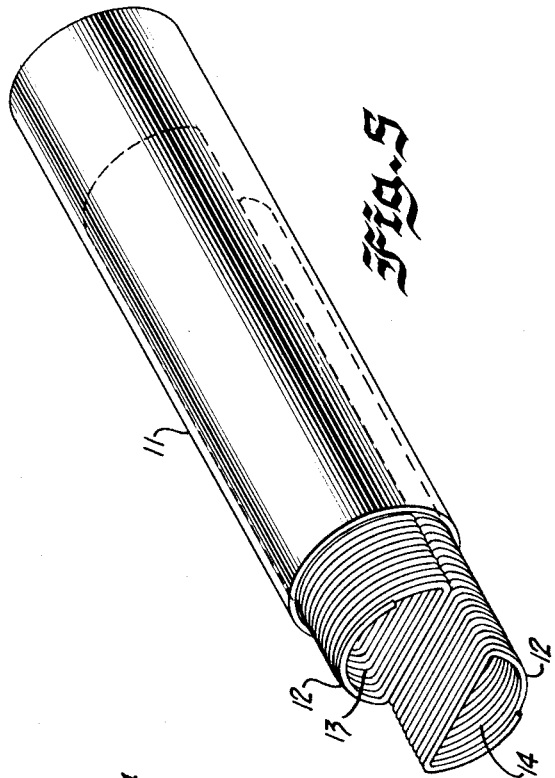
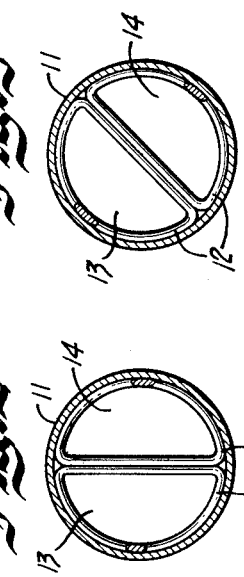
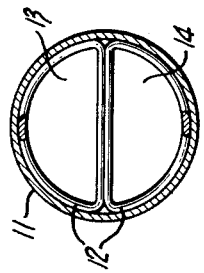
INVENTOR.
WILLIAM W. WITORT
BY
John D. Dewey
ATTORNEY Dec. 29, 1964    W. W. WITORT    3,163,710
CONNECTION MEANS FOR DIVIDED ELECTRICAL RACEWAYS
Filed Jan. 17, 1962    2 Sheets-Sheet 2
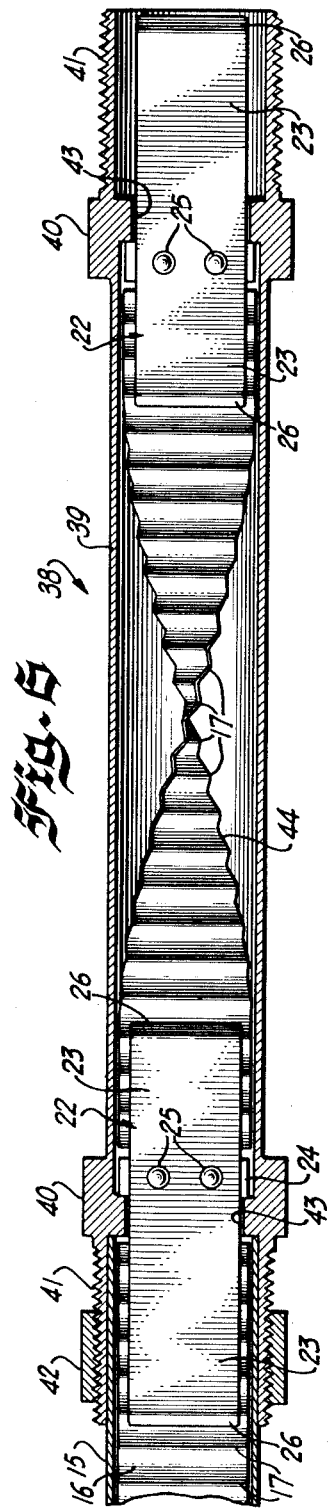
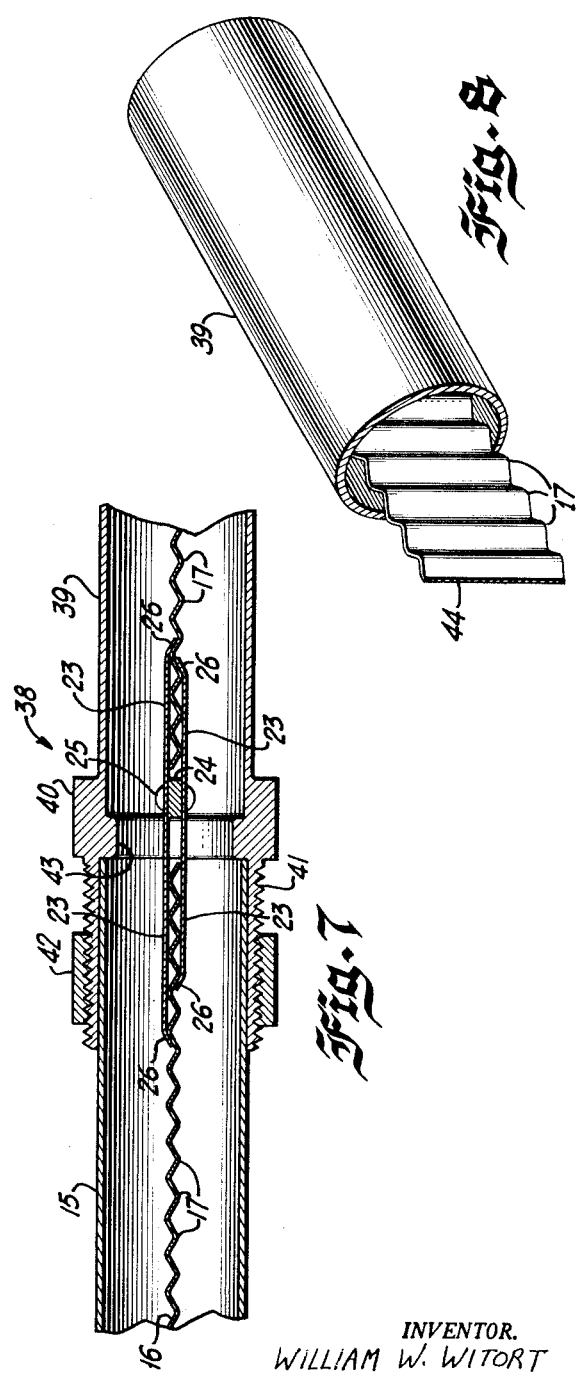
INVENTOR.
WILLIAM W. WITORT
BY
John D. Dewey
ATTORNEY

United States Patent Office 3,163,710
Patented Dec. 29, 1964

3,163,710
CONNECTION MEANS FOR DIVIDED ELECTRICAL RACEWAYS
William W. Witort, 1480 N. Milwaukee, Libertyville, Ill.
Filed Jan. 17, 1962, Ser. No. 166,819
4 Claims. (Cl. 174—84)

The invention relates to new and improved raceway coupling and connector means for use in a closed multiple wire service distribution system. More specifically, the invention is directed to new and improved connection means for use with divided raceways or conduit, and to a multiple wire service distribution system in which the new and improved connection means is employed, the connection means establishing and maintaining a plurality of separated wire distribution raceways which may be spirally translated therein.

As disclosed in my co-pending application Serial No. 53,448, filed September 1, 1960, now Patent No. 3,110,753, a recent development in closed wire distribution system design involves the provision of internally divided, bendable electrical metallic tubing through which multiple wire services of different operating potential are distributed. A thin metallic membrane-type divider extends centrally through the tubing or conduit and establishes therein a pair of fully separated raceways. The metallic membrane or divider is flexible and is provided with generally transversely extending corrugations thus permitting the same to be bent with the conduit in any direction and still maintain its bisecting, subdividing position within the conduit. The system also includes internally divided distribution and/or termination boxes to which the conduit is attached by suitable connectors, suitable couplers being used to interconnect lengths of conduit installed between the boxes. The connectors and couplers are also provided with means received therein which interconnect the dividers of the coupled conduit lengths or the divider of a conduit and the partition means of a box. Thus the connectors and couplers include bridging means which maintain raceway separation therethrough.

It has been found that with the bending of a length of conduit that the divider therein may become translated throughout a portion of its length to, in effect, result in a longitudinal rotation of the raceways therein. Thus where a pair of conduit lengths are coupled together and connected at opposite ends between spaced internally divided boxes, it is possible that somewhere throughout the interconnected lengths of conduit the internal raceways thereof have been spirally translated to at least some extent. This spiral translation under extreme conditions can result in a complete reversing of the raceways so that in one box the partitioned area thereof provided for power termination may be in communication with a conduit raceway which at the other box is in communication with the separated area provided for phone service termination. In most instances raceway translation does not occur to the extreme described but merely occurs to an extent that adjacent divider ends to be interconnected through a coupler or connector are cocked at different angles relative to each other. The transversely corrugated divider by its very nature may be twisted in its conduit to provide for divider end alignment for interconnection but the proximity of a major bend in the conduit may limit the extent to which the divider may be translated for adjacent divider end alignment through a coupler or connector.

It is an object of the present invention to provide new and improved connection means adapted for use in interconnecting adjacent ends of divided conduit or one end of a divided conduit with a divided or partitioned box, the connection means defining internally thereof separated raceways adapted for communicating alignment with the raceways and wire distribution areas of the conduit and box, the raceways of the connection means being subject to ready spiral translation to any extent desired, thus providing for complete raceway adjustment alignment solely within the connection means and eliminating adjustment for raceway alignment within the conduit.

Another object is to provide a new and improved connection means for use with multiple wire service distribution divided conduit, the connection means including longitudinally extending divider means therein which defines at least a pair of raceways for distribution of separate wire services therethrough, the divider means of the connection means being formed from cooperating means permitting spiral translation of the raceways in the connection means for communicating alignment thereof with corresponding raceways of the divided conduit.

Still a further object is to provide a new and improved divided conduit system which internally defines separated continuous raceways for multiple wire service distribution, the system including connection means for interconnecting conduit lengths and for interconnecting conduit and boxes, which connection means includes special divider means therein which are capable of being spirally translated to provide for continued prescribed raceway communication throughout the entire system.

Other objects not specifically set forth will become apparent from the following detailed description of the invention made in conjunction with the accompanying drawings wherein:

FIG. 1 is a fragmentary section in elevation of one form of connection means of the present invention mounted in interconnecting relation between an end of a divided conduit and a wall portion of a wire distribution and/or termination box;

FIG. 2 is a transverse section of the connection means of FIG. 1 taken generally along line 2—2 therein;

FIG. 3 is another transverse section of the connection means of FIG. 1 taken generally along line 3—3 therein;

FIG. 4 is still another transverse section of the connection means of FIG. 1 taken generally along line 4—4 therein;

FIG. 5 is a perspective of the central tube portion of the connection means of FIG. 1 including the divider means therein;

FIG. 6 is a fragmentary section of another form of connection means of the present invention illustrating its use in interconnecting adjacent ends of a pair of conduits;

FIG. 7 is a fragmentary section of one end of the connection means of FIG. 6 viewed at right angles thereto; and FIG. 8 is a fragmentary perspective of a portion of the connection means of FIG. 6 as viewed generally along line 8—8 therein.

Referring to FIGS. 1 and 5, the connection means 10 includes a tube 11 in which is received a pair of D-shaped spring coils 12 arranged in flat-sided engagement. Each coil 12 is tightly wound and is dimensioned to be snugly slidably received in the tube 11. The coils 12 define separate raceways 13 and 14 internally thereof which extend longitudinally of the tube 11 and which are completely separated from one another by reason of the tightly wound transverse rib-like structure of the coils 12. FIG. 5 illustrates the relaxed positions of the coils 12 within the tube 11 and FIGS. 1–4 illustrate the progressive spiral translation of the coils 12 in the tube 11 during operative use thereof. The very nature of the coils 12 permits extensive spiral translation although only a 90° translation from end to end is illustrated. It should be understood, however, that a complete 180° translation is readily available from one end to the other within the tube 11.

Referring to FIG. 1, the left hand portion as viewed illustrates an end of an electrical metallic tubing section 15 of known type which includes therein a transversely corrugated, relatively thin divider membrane 16 of the type specifically illustrated in FIGS. 6–8. The divider 16 extends the full length of the conduit section 15 and is snugly but slidably received therein to accommodate bending of the conduit 15 during installational use thereof. The divider 16 will accommodate any degree or direction of bending of the conduit 15 by reason of the provision of the transverse corrugations 17 therein. Thus the conduit 15 is sub-divided into a pair of separated raceways through which different wire services (not shown) of different operating potentials may be fed.

A standard coupler 18 interconnects the end of the conduit 15 with the tube 11. This coupler generally includes a sleeve portion 19 provided with an internal annular rib or shoulder 20 against which the adjacent ends of the conduit 15 and the tube 11 abut. External opposite end portions of the coupler sleeve 19 are threaded and receive thereabout locking nuts 21 which fixedly clamp the ends of the conduit 15 and tube 11 within the coupler 18. Received within the coupler 18 is a bridging means which, in the form illustrated, is a double-ended spring clip 22 which is best shown in the right hand portion of FIG. 1. The clip 22 is formed from a pair of spring leaves defining at opposite ends thereof pairs of co-acting spring fingers 23. The spring leaves are interconnected centrally thereof by a transverse bar 24 which projects outwardly thereof for abutment with the shoulder 20 of the coupler 18. Suitable fasteners such as rivets 25 fix the spring leaves to the bar 24. At each end of the clips 22 one spring finger 23 is longer than the other cooperating spring finger to provide for ready insertion of a divider or partition edge between the same. The end of each spring finger is provided with a bent-in gripping portion 26 which grips one of the corrugated ribs 17 of the divider 16 and which also grips one of the transverse rib-like sections of the coils 12. Thus the clip 22 has received between the spring fingers at one end thereof the divider 16 of the conduit 15 and has received between the spring fingers at the other end thereof the flat sections of the combined coils 12 in the tube 11. In this manner the clip 22 in the coupler 18 completely interconnects the divider means of the conduit 15 and tube 11 and provides a bridging means therebetween to maintain complete separation between the communicating raceways of the conduit 15 and the connection means 10.

The right hand portion of FIG. 1 illustrates a corner portion of a wire distribution and/or termination box 27 having a wall portion 28 provided with a circular aperture 29 in which is received a standard type box connector 30. This connector generally includes a sleeve portion 31 in which one end of the tube 11 is received, this sleeve portion being suitably crimped to the tube 11 to fixedly retain the same. The connector 30 is provided with an external annular shoulder which abuts the outer surface of the wall 28 of the box 27. An externally threaded sleeve portion 33 extends through the aperture 29 into the box 27 and has received thereabout a locking nut 34 which attaches the connector to the box.

Within the box 27 a suitable partition means is provided and a ledge or edge portion 35 of such is shown in FIG. 1. The partition means functions in the known manner to sub-divide the box into separated wire distribution and/or termination areas providing for maintenance of multiple wire service segregation therein. The partition portion 35 actually bisects the aperture 29 and is fixed within the box 27 against translation. Accordingly, for proper alignment of the separate raceways established in the conduit 15 and carried on through the connection means 12, suitable translation of the raceways must be provided for externally of the box as translation thereof cannot occur within the box. The system is completed by the use of another clip 22 in interconnecting the coils 12 of the connection means 10 with the partition 35 of the box 27. The clip 22 maintains complete separation between the separate raceways throughout the connector 30 and provides a bridging means in this respect.

By comparing the position of the divider 16 of the conduit 15 with the position of the partition portion 35 of the box 27 it will be noted that these elements are at right angles to one another. Thus suitable 90° translation of the raceways must occur between the conduit 15 and the box 27 to provide for proper delivery of the wire services into the box 27. In this regard it will be understood that the partition portion 35 in the box 27 divides that portion of the box illustrated into an upper wire service receiving area 36 and a lower wire service receiving area 37. Referring to FIG. 2, a wire service delivered from one side of the divider 16 of the conduit 15 into the raceway 13 is at this point in the connection means 10 still improperly positioned for delivery into the box 27. However, during installation of the system illustrated in FIG. 1, the coils 12 are twisted within the tube 11 and are fixed at opposite ends in their twisted relation by the clips 22. In this regard it will be recalled that the partition portion 35 in the box 27 is fixed in the box. Thus the separate wire service delivered into the raceways 13 and 14 of the connection means 10 become longitudinally translated in a rotational sense as illustrated in the step-wise translation of FIGS. 2–4. At the point of entry into the box 27, the wire service in the raceway 13 is received in the distribution area 36 of the box above the partition portion 35 and the separate wire service in the raceway 14 is delivered into the distribution area 37 below the partition portion 35 of the box. Twisting in opposite direction in the connection means 10 will result in a reversal of the wire services thus providing for complete versatility of raceway translation in either clockwise or counterclockwise directions.

While 90° translation in either direction has been described, it will be understood that complete 180° translation is possible by reason of the special divider means in the connection means 10. The coils 12 supply transverse rib-like sections which aid materially in the efficient pulling of wire therethrough even though the raceways 13 and 14 are rather substantially longitudinally translated. While the use of a pair of coils 12 has been illustrated and described, it will be understood that the very shape and design of a closely wound D-shaped coil permits the use of just a single coil in the tube 11. The dimensions of a single coil would be somewhat changed to provide for the flat section thereof corresponding to the exact diametral center of the tube 11 thus assuring proper maintenance of the position of the single coil in the tube throughout the entire length thereof. The use of separate coupler and connector means has been described but it will be appreciated that the tube 11 may be supplied with integral coupler and connector elements and be, in fact, a coupler or connector if desired. This particular feature is shown in the embodiment of the invention in FIGS. 6 and 7. Any suitable bridging means may be used in spanning the space between the ends of the separate dividers of the conduit and connection means. While the springs 12 have been defined as snugly but slidably positioned in the tube 11, it will be appreciated that one end portion of the coils may be permanently fixed within the tube 11 with the other end portion of the coils being free for rotation to obtain the spiral translation described.

FIGS. 6–8 illustrate a modified connection means 38 which is of one-piece construction. A tube-like body portion 39 terminates at opposite ends thereof in raised hex heads 40 having integrally joined therewith externally threaded sleeve portions in which the conduit 15 of the type previously described is adapted to be received. A locking nut 42 is received on each sleeve 41 to clamp a conduit end therein. The opposite ends of the connection means 38 include internal annular shoulders 43 which on their outer surfaces are adapted to receive thereagainst the end of a conduit section 15 and on their inner surfaces are adapted to hold a spring clip 22 in operative position. The clips 22 have been previously described and function in the same manner with the connection means 38. The connection means illustrated in FIG. 6 is in the form of a coupler adapted to interconnect sections of divided conduit. However, it should be understood that the connection means 38 may be in the form of a connector having at one end thereof the conduit attachment means illustrated and at the other end thereof a suitable box connection means incorporating the structural features of the connector 30 of FIG. 1.

The connection means 38 includes therein a longitudinally extending, transversely corrugated divider strip 44 which is of the same construction as the divider 16 of the conduit 15 previously described. The configuration of a divider strip of this type is best illustrated in FIGS. 7 and 8. This strip is relatively thin and is formed with a plurality of transverse rib-like sections permitting longitudinal twisting of the divider strip as shown in FIG. 6. Thus this type of divider when used in a conduit section is susceptible to bending in any direction with the conduit while maintaining internal raceway subdivision thereof and further is readily susceptible to twisting in a uniform manner also while maintaining efficient raceway subdivision in the connection means 38.

The necessity of raceway translation for box connection has been described in conjunction with FIG. 1. With FIG. 6 it will be appreciated that raceway translation can occur between interconnected divided conduits. It is not unusual that during installation of a conduit system the installer will make his final connection between boxes somewhere in the conduit run and not necessarily at one of the boxes itself. Thus where installation is completed in this manner it may be that the divider strips 16 of adjacent conduit ends come together in angular relation and translation is necessary. Complete translation even to an extent of 180° as shown in FIG. 6 is made possible by the unique connection means of the present invention. Furthermore, the uniquely designed divider means providing the transverse rib-like sections permit ready pulling and feeding of wire services in the separate raceways through the area of extensive spiral translation. The corrugations 17 of the divider strips 16 and 44 need not necessarily be deep as long as sufficient material is provided to accommodate the bending and twisting of these strips as required during operational use thereof. It will also be understood that the divider strips of the conduit sections may be fixed in the sections if desired as all translation occurs in the connection means. Furthermore, the unique connection means of the present invention are readily adapted for use with rigid conduit having rigid and fixed dividers therein.

Obviously, certain modifications and variations of the invention as hereinbefore set forth may be made without departing from the spirit and scope thereof, and therefore only such limitations should be imposed as are indicated in the appended claims.

I claim:

1. In combination, divided conduit provided with longitudinally extending first divider means establishing at least a pair of separate raceways for multiple wire service distribution therethrough, conduit connection means having an end of said divided conduit connected thereto, said conduit connection means being tubular and including longitudinally extending second divider means therein sub-dividing the same into at least a pair of separate raceways for continued multiple wire service distribution therethrough, said second divider means being in the form of a D-shaped coil with the convolutions thereof being tightly wound permitting spiral translation of said raceways in said connection means for communicating alignment thereof with the corresponding raceways of said divided conduit, and bridging means interconnecting said first and second divider means.

2. In combination, a divided conduit provided with longitudinally extending first divider means establishing at least a pair of separate raceways for multiple wire service distribution therethrough, conduit connection means having an end of said divided conduit connected thereto, said conduit connection means being tubular and including longitudinally extending second divider means therein sub-dividing the same into at least a pair of separate raceways for continued multiple wire service distribution therethrough, said second divider means being in the form of a pair of D-shaped coils arranged in flat-sided engagement with the convolutions thereof being tightly wound permitting spiral translation of said raceways in said connection means for communicating alignment thereof with the corresponding raceways of said divided conduit, and bridging means interconnecting said first and second divider means.

3. Connection means for use with multiple wire service distribution divided conduit wherein the conduit is provided with longitudinal divider means establishing at least a pair of raceways to maintain wire service separation, said connection means comprising a rigid tubular member including a transverse internal divider means extending longitudinally thereof and subdividing the interior of said tubular member into at least a pair of longitudinally continuous raceways for distribution of separate wire services therethrough, said divider means being fully rotatably translatable in said tubular member relative to said tubular member and being formed with a plurality of transverse rib-like sections which provide longitudinal continuity to said divider means but permit longitudinal twisting of said divider means between the opposite ends of said divider means for spiral translation of said raceways in said connection means for communicating alignment thereof with corresponding raceways of divided conduit, said divider means being in the form of a D-shaped coil with the convolutions thereof being tightly wound.

4. Connection means for use with multiple wire service distribution divided conduit wherein the conduit is provided with longitudinal divider means establishing at least a pair of raceways to maintain wire service separation, said connection means comprising a rigid tubular member including a transverse internal divider means extending longitudinally thereof and subdividing the interior of said tubular member into at least a pair of longitudinally continuous raceways for distribution of separate wire services therethrough, said divider means being freely rotatably translatable in said tubular member relative to said tubular member and being formed with a plurality of transverse rib-like sections which provide longitudinal continuity to said divider means but permit longitudinal twisting of said divider means between the opposite ends of said divider means for spiral translation of said raceways in said connection means for communicating alignment thereof with corresponding raceways of divided conduit, said divider means being in the form of a pair of D-shaped coils arranged in flat-sided engagement with the convolutions thereof being tightly wound.

References Cited in the file of this patent

UNITED STATES PATENTS

| 1,930,285 | Robinson | Oct. 10, 1933 |
| 2,550,725 | Schultz | May 1, 1951 |

FOREIGN PATENTS

| 254,308 | Great Britain | Oct. 21, 1926 |